May 1, 1956  T. D. CRIST  2,743,546
LEADER-KEEPERS
Filed Oct. 18, 1951
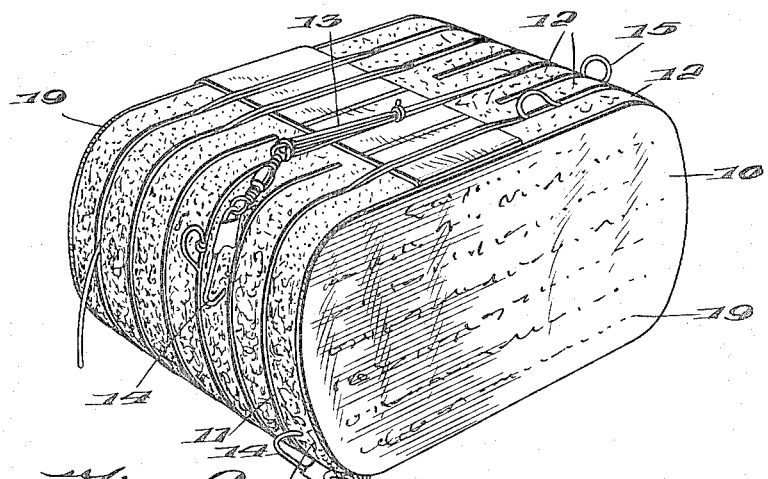
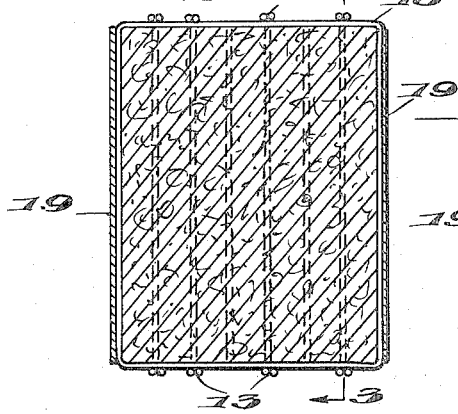
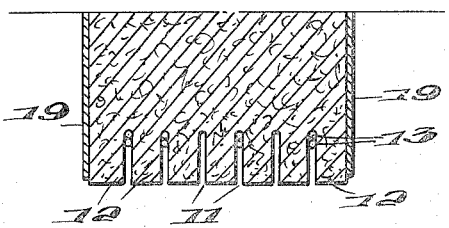
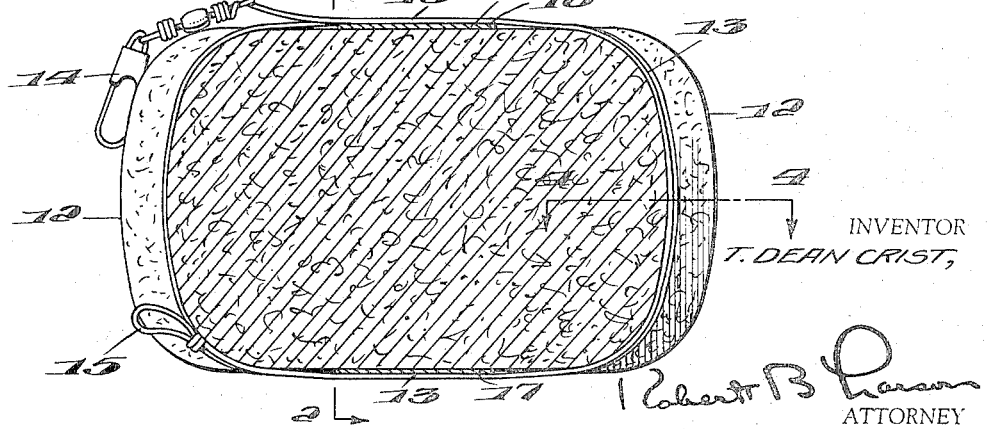
INVENTOR
T. DEAN CRIST,
Robert B. Pearson
ATTORNEY United States Patent Office 2,743,546
Patented May 1, 1956

2,743,546

LEADER-KEEPERS

Thomas Dean Crist, Tucson, Ariz.

Application October 18, 1951, Serial No. 251,849

2 Claims. (Cl. 43—54.5)

This invention relates to leader-keepers and in particular to leader-keepers made from a single piece of sponge-like material.

In the past, there have been numerous attempts to devise leader-keepers which meet the various requirements of the fishermen. These prior devices all have disadvantages which I have overcome by the present invention. Some known leader-keepers are formed as a part of rather complicated fishing kits. Others are made up of a number of different members and thus become unnecessarily expensive. Still other leader-keepers have no provision for attaching the hook or pin of the leader to the leader-keeper; and still others are not constructed so they will float in the event that the leader-keeper is dropped in the water. Yet a further disadvantage of prior leader-keepers is that there was no provision for securely retaining the leader throughout its length (no matter how long or short) as well as both ends of the leader without the possibility of losing the leader in the leader-keeper, thereby making the leader most unavailable and unaccessible to the fisherman.

It is an object of my invention to overcome the disadvantages by constructing a leader-keeper from a single piece of floatable and deformable sponge-like material and forming discontinuous grooves around the periphery of the sponge material.

The sponge-like material is very desirable for at least three reasons, the first being that it will float, the second, that the hooks or pins on the ends of the leader may easily be inserted in the sponge material (which would not be possible with a leader-keeper made of solid rubber), thus avoiding the possibility that the hooks or pins will catch onto the clothes or body of the user, or will catch onto and become entangled with other gear in the tackle box, and the third, that the ends of the leader-keeper can be squeezed together to hold the loose ends of the leader securely in the grooves.

The sponge material will, in all cases, strongly tend to retain its original shape, no matter what size leaders are inserted, because of its resiliency, thus firmly retaining the leader throughout its length as well as retaining both ends. However, if the groove becomes spread through retaining large gauge leaders, the grooves may be brought back to razor blade thinness by squeezing the ends of the leader-keeper. The important feature is that the sponge material, ordinarily and by squeezing (when necessary), molds itself around the leader, thus securely holding it throughout the portions lying in the grooves.

I have found it to be very desirable to construct the leader-keeper from cellulose acetate or cellulosic sponge-like material. This particular material, or any comparable material, is deformable, as well as being floatable, so that, when the end of the leader is inserted in one of the grooves, the material can be squeezed together, thus securely retaining the end of the leader.

Further, by having discontinuous grooves, the fisherman can always see his leaders and thus has the advantage of determining at a glance the size, length, and weight of his leader or leader material. Additionally, if the grooves were not discontinuous, the whole length of the leader would have a tendency to become buried in the grooves and thus would not be easily obtainable unless perhaps a hook at the end of the leader were sticking out. On the other hand, with the present invention, a major portion of the leader is buried in the groove free from the possibility of becoming entangled with other gear, but there is always a portion which is readily visible and obtainable.

These and other objects will become understood from the appended drawings in which:

Figure 1 is a perspective view showing my invention;

Figure 2 is a cross-sectional view along lines 2—2 of Figure 3;

Figure 3 is a cross-sectional view taken along lines 3—3 of Figure 2; and

Figure 4 is a fragmentary cross-sectional view taken along lines 4—4 of Figure 3.

In Figure 1 is shown a leader-keeper 10 which consists of a piece of sponge-like material which is generally rectangular or oval shaped in section. Parallel spaced grooves 11 are formed at each end of the rectangular-shaped sponge-like material. Those grooves divide the end portion of the leader-keeper into a plurality of raised portions 12 between which are placed leaders 13. The consistency of the sponge-like material permits the hooks or attaching means 14 on the ends of the leaders to be inserted in the leader-keeper. Also, because of the type of material used, the end portions of the leader-keeper may be squeezed together with the fingers so as to clamp securely the end of the leader in the leader-keeper.

As shown most clearly in Figures 2, 3, and 4, the grooves are formed only in the end portions of the leader-keeper so that a middle portion 17 of the leader-keeper is substantially without grooves. By this construction, there will always be a substantial portion of the leader which is clearly visible to the eye of the fisherman.

With the general configuration as shown in the drawing, it is possible to wrap a strip of sheet material 18 of some type around the periphery of the leader-keeper in a direction transverse of the direction of the grooves. Lines may be placed on the strip 18 running in the direction of the groove so that, to the eye of the fisherman, the grooves appear to be continuous, thus eliminating the possibility that the leader would be started in one groove at one end of the leader-keeper and placed in a groove other than the corresponding groove at the other end of the leader-keeper.

If desired, labels of sheet material 19 may be placed on opposite faces of the leader-keeper, and these labels may contain directions for use of the leader-keeper as well as the manufacturer's name. Preferably, the sheet material referred to above should be able to withstand the effects of being soaked with water, so that, if the leader should fall into the water, the sheet material would not be lost.

The use of the leader-keeper is extremely simple. The fisherman first inserts one end of the leader in any of the grooves and pulls the end tightly into the groove. If the groove should be so wide that the end of the leader is loose in the groove, the end of the leader-keeper can be pinched together, thus holding the end of the leader securely. The leader is then wound around the leader-keeper until the end of the leader is reached. The fisherman can then stick the hook or hook fastener into the sponge-like material. By having a plurality of grooves spaced from each other, it is possible to attach a number of separate leaders in separate grooves so they are spaced from each other and easily obtainable. It is also possible, if desired, to attach a number of leaders end to end and place them all in one groove.

It should now be apparent that the device can easily be manufactured and will be of such rugged construction as to have a very long life. The leader-keeper may be cut from a sheet of cellulose acetate or other sponge-like material into blocks which are approximately 3½ inches long, 1½ inches wide, and 2 inches thick. Grooves can then be cut in the ends of the leader-keeper by a knife or other sharp instrument so that they will be approximately a quarter of an inch apart. The sheet material strips and labels 18 and 19 may then be pasted or otherwise attached to the leader-keeper.

It should be understood that, while I have described the preferred embodiment of my invention, there are numbers of obvious variations which can be introduced without departing from the scope of my invention as set forth in the appended claims.

I claim:

1. A leader keeper comprising an integral piece of sponge-like material having the general shape of a parallelepiped with two opposing ends being rounded, said integral piece of sponge-like material being provided with a plurality of parallel slits disposed in each rounded end, the slits of one end being substantially aligned with the slits of the other end, said slits adapted to receive and nest a leader when wrapped around said leader-keeper, and said sponge-like material constituting means for clamping the leader within the slits.

2. A leader-keeper according to claim 1 including means disposed centrally of said rounded ends to insure proper alignment of said slits when wrapping a leader around the holder.

References Cited in the file of this patent

UNITED STATES PATENTS

| | | |
|---|---|---|
| 578,458 | Knieriemen | Mar. 9, 1897 |
| 2,270,757 | Liska | Jan. 20, 1942 |
| 2,332,036 | Wilburn | Oct. 19, 1943 |
| 2,553,097 | Lampe | May 15, 1951 |
| 2,597,304 | Dillingham | May 20, 1952 |

FOREIGN PATENTS

| | | |
|---|---|---|
| 27,109 | Great Britain | 1897 |
| 472,365 | Great Britain | Dec. 19, 1938 |